3,033,648
HYDROTHERMAL PROCESS FOR THE MANUFACTURE OF HYDRATED CALCIUM SILICATES
Carl R. Vander Linden, Bound Brook, N.J., assignor to Johns-Manville Corporation, New York, N.Y., a corporation of New York
No Drawing. Filed Feb. 4, 1959, Ser. No. 791,007
21 Claims. (Cl. 23—110)

This invention relates to the manufacture of hydrated calcium silicates, and more particularly to an improved hydrothermal method for manufacturing hydrated calcium silicate products of increased bulk density and the products thereof.

This application is a continuation-in-part of my copending United States Patent application, Serial No. 580,313, filed April 24, 1956, and now abandoned.

The preparation of hydrated calcium silicates by the hydrothermal reaction of lime and finely divided reactive silica has been heretofore proposed. For example, United States Letters Patent No. 1,574,363, to Calvert exemplifies a typical hydrothermal manufacturing procedure consisting of a batch type reaction including the steps of charging a reaction vessel with a slurry of finely divided lime and siliceous material, such as diatomaceous silica, and then heating said materials to reaction temperatures in the order of 212° F., or higher if a pressure vessel is employed, for a period of time sufficient to effect substantial completeness of the reaction. Typical products resulting from this type of reaction are a finely divided particulate or granular porous material having a fluffed bulk density of 4 to 7 lbs. per cu. ft., with the bulk density decreasing with higher reaction temperatures. The wet cake density of such dried particulate hydrated calcium silicates varies from 9 to 11 lbs. per cu. ft. These products also have very high absorbent properties, e.g., their water absorption as measured by a Gardner-Coleman test normally consists of about 375% to as high as 700%, with absorptive capacities increasing with increased reaction temperatures. These highly absorbent, low bulk density calcium silicates are useful as a carrier for insecticides or other liquid chemicals and as a bulking agent for dry powder formulations, among other applications.

However, highly absorbent, bulky hydrated calcium silicates are not suitable for certain applications wherein it is desirable to utilize a hydrothermally prepared hydrated calcium silicate but a product with a relatively low absorption capacity and high bulk density. For example, hydrothermally prepared hydrated calcium silicates are highly effective as drycleaning sweeteners preventing build-up of free fatty acids in drycleaning solvents. Such hydrated calcium silicate products may be added as a precoat to the drycleaner's filter and the solvent passed through the precoat, or they can be added to the washer and removevd at the filter along with the soil. However, a drycleaner's filter has a limited cake capacity and when the filter cake accumulates to the point of filling the filter chamber it is necessary to stop the operation and remove the cake from the filter. Although calcium silicate products prepared according to Calvert's teaching are an effective drycleaning sweetener insofar as acid control, it has the disadvantage of rapidly filling the drycleaner's filter due to its low cake density. Hence a hydrated, hydrothermally prepared, high density calcium silicate having the same "acid-sorption" per pound would be desirable and advantageous in this particular exemplary application as well as numerous others.

It is a principal object of this invention to provide an improved hydrothermal method of manufacturing discrete hydrated calcium silicates of increased bulk density.

It is a further object of this invention to provide a method of hydrothermally preparing particulate hydrated calcium silicates with a substantially uniform and large particular structure rendering them freely flowable and handleable.

It is a still further object of this invention to provide a means of controlling or increasing bulk density, regulating the particle size and absorption capacity of hydrothermally prepared, particulate hydrated calcium silicates.

These and other objects and advantages of the invention will become apparent when consideration is given to the hereinafter detailed description thereof.

According to the present invention a material and beneficial bulk density increase and reduction in absorption, among other advantages, can be achieved in hydrothermally prepared, particulate hydrated calcium silicate products by regulating the addition or initial combining of the reactants. Thus, if a hot suspension of reactive siliceous material, such as diatomaceous silica, is first fed into a reaction vessel and the lime suspension subsequently added thereto, heat being provided to incite reaction and to provide and maintain the desired reaction conditions, products exhibiting physical as well as chemical properties comparable to those obtained from a Calvert type reaction, comprising simply combining reactive siliceous material and lime in an aqueous medium and then increasing the temperature of said reactants to reaction temperature, are obtained for like reaction conditions, i.e., temperature, reaction time, concentration or liquid to solids content, and reactants. It has been discovered, however, that effecting initial contact of the lime and siliceous reactants by adding or introducing the siliceous material to a concentrated lime suspension, for example, first filling the reaction vessel with a hot lime suspension and subsequently adding the siliceous suspension, while maintaining said reactants at a temperature at least in the vicinity of 250° F. but no less than 212° F. and preferably in the approximate range of 300 to 375° F., results in particulate hydrated calcium silicates of materially different physical properties such, for example, as substantially higher bulk densities, lower absorption characteristics, and larger average particle size. Moreover, these distinguishing and significant properties are obtained when identical reactants and reaction conditions are utilized other than the specified order and temperature of addition or combining the reactants. Typical property values obtained from hydrated calcium silicate products prepared according to a hydrothermal method which included adding the reactive silicate material to a lime suspension at a temperature of at least 212° F. and reacting the same for approximately 2 hours at about 360° F. comprise a fluffed bulk density of approximately 11 to 12 lbs. per cu. ft., a wet cake density of about 17 lbs. per cu. ft., and Gardner-Coleman water absorption of 275%.

Bulk density increases and water absorption decreases of even greater magnitude can be obtained in hydrothermally prepared, particulate hydrated calcium silicates through initial introduction or addition of the siliceous reactant into a lime suspension by continuous and simultaneous feeding of the aqueous suspensions of said siliceous reactant and lime to a stirred reaction vessel whereby the aqueous suspension of reactive siliceous material is continuously added or introduced into an aqueous suspension of lime, retaining the reactants in said vessel at a temperature and for a reaction or dwell period sufficient to effect substantial reaction to result in the particular hydrated calcium silicate desired, and continuously and simultaneously with said feeding of the reactants removing the resulting reactions products from the reactor at a rate approximately equivalent to the rate of feed. Typical hydrated calcium silicate product property values resulting from the foregoing procedure when using a reaction temperature of approximately 360° F. and a reaction or retention time of about 2 hours are a fluffed bulk density of approximately 15 lbs. per cu. ft., a wet cake density of 20 lbs. per cu. ft., and a Gardner-Coleman water absorption of 240%.

The chemical, or physico-chemical mechanism of this phenomenon is neither fully apparent nor claimed to be completely understood; however, for purposes of illustration rather than explanation or limitation, observation indicates that the physical characteristics of the product are determined during the period of initial contact and/or reaction between the reactants, a period when the lime concentration is at a maximum. It is believed that the reactive nuclei which form in the initial part of the reaction determine the physical characteristics of density, particle size and absorption and it is postulated that the nuclei formed in a medium of a high lime concentration consist of a calcium rich phase of calcium silicate. This ocurs in a process wherein the diatomaceous silica is added to a lime suspension and/or where both reactants are continuously combined or added to a reaction vessel and new lime suspension is continuously supplied always providing a high lime concentration during the initial phase of contact and/or reaction when these nuclei are formed. On the other hand, the nuclei formed when the lime is added to the diatomaceous silica suspension apparently consist of a calcium silicate with a much lower calcium content. The nuclei which form in the Calvert type process consisting of combining the reactants at subreactive temperatures and heating to gradually approach and achieve reactive conditions no doubt also consist of a low calcium content calcium silicate.

The following examples illustrate and compare the prior art procedures with variations in the practice of the present invention and the substantial meritorious results thereof over the prior art practices. It is to be understood that the specified reactants, reaction conditions such as time, temperature and concentration, specific techniques or the like are exemplary and are not to be construed to limit the invention to the particular components, proportions or other specified conditions or techniques in the hereinafter described examples.

EXAMPLE I

*Addition of Lime to Silica Suspension in a Batch Reaction*

Three thousand two hundred and sixty gallons of an aqueous suspension of diatomaceous earth (silica) comprising 0.92 lb. of solids per gallon were passed through a heat exchanger raising the temperature of the same to about 300° F. and discharged into a pre-heated, stirred reaction vessel wherein said suspension was further heated to and maintained at 370° F. by direct injection steam. After addition of the diatomaceous earth suspension, 1500 gallons of water were pumped into the reaction vessel over a 40 minute period upon being similarly pre-heated to a temperature of 300° F. in the heat exchanger. Simultaneous with the addition of the water, 860 gallons of an aqueous suspension of hydrated lime comprising 1.4 lbs. of CaO/gal. were also added to the reaction vessel, an amount sufficient to result in a CaO/SiO$_2$ mol ratio of 0.5. Steam was injected into the reactor throughout the addition of said reactants to maintain the temperature of the same at about 370° F. The reaction was continued for a period of 2 hours after all reactants had been added and upon removal from the reactor and filtering of the resulting suspension the cake was dried to a moisture content of about 5% and ground in a hammermill.

EXAMPLE II

*Premixing of Lime and Silica as Taught by Calvert in a Batch Reaction*

An aqueous suspension of hydrated lime, diatomaceous earth (silica) and water was prepared by mixing 1640 lbs. of hydrated lime (1200 lbs. of CaO), 3000 lbs. of diatomaceous silica, and 4500 gallons of water at room temperature to provide a reactive medium of lime and siliceous material having a CaO/SiO$_2$ mol ratio of 0.5. This suspension was pumped into a cold, stirred reaction vessel and was then heated by direct injection steam to a temperature of 370° F. and maintained at said temperature for a period of 2 hours. Upon completion of the reaction period the resulting suspension was filtered, the cake dried to a moisture content of about 5% and ground in a hammermill.

EXAMPLE III

*Addition of Silica to Lime Suspension in a Batch Reaction*

The reaction conditions in the following example are identical to those of Example I except for the order of addition of the reactants. Eight hundred and sixty gallons of an aqueous suspension of hydrated lime comprising 1.4 lbs. of CaO per gallon of water were added to a pre-heated, stirred reaction vessel followed by 1500 gallons of water and the temperature thereof brought to 370° F. by steam injection. Next, 3260 gallons (3000 lbs. of diatomaceous earth) of a slurry of diatomaceous earth (silica) containing 0.92 lb. of solids per gallon was pumped through a heat exchanger bringing its temperature up to 300° F. into the reaction vessel over an 80 minute period. The ratio of lime to diatomaceous silica was proportioned to give a CaO/SiO$_2$ mol ratio of 0.5. The contents of the reaction vessel were maintained at 370° F. for 2 hours during which time said contents were stirred by mechanical agitator. Upon completion of the reaction period the slurry was filtered, the filter cake dried to a moisture content of about 5% and ground in a hammermill.

EXAMPLE IV

*Continuous Addition of Reactants and Continuous Removal of the Reaction Product*

An aqueous lime suspension comprising 1.4 lbs. of CaO per gallon of water and separate aqueous suspension of siliceous material comprising 0.55 lb. of finely ground diatomaceous silica per gallon of water were continuously and simultaneously fed into the bottom of the first of 2 stirred reactors connected in series. The silica suspension being added at a rate of about 90 gallons per minute and the lime suspension at a rate of about 16.5 gallons per minute to provide an approximate CaO/SiO$_2$ mol ratio of 0.5. The separate reactive suspensions were added through separate pipe lines. The diatomaceous earth suspension was pre-heated in a heat exchanger to about 300° F. and steam was injected into the first reactor to maintain the temperature of its contents at 370° F. When the first reactor reached its overflow line the suspension of reacting lime and siliceous material continuously passed over into a second reactor which upon filling to its overflow line discharged a suspension of the product continuously and simultaneously at a rate approximately equivalent to that of the feed. The reacted suspension was cooled in a heat exchanger and depressurized through a valve. The reaction time (vessel working capacity divided by rate of discharge from the second reactor) was about 2 hours; however, several hours are required to reach equilibrium in a continuous flow process but once equilibrium is obtained there was neither an increase nor decrease in the quantity of material in the reactors since the amount of reacted suspension removed from the second reactor was equivalent to the amount of reactants added to the first reactor. As in the foregoing examples the suspension from an equilibrium condition was filtered, the cake dried and ground in a hammermill.

The solids content of the reacted suspensions, from each of the foregoing examples were approximately the same: 0.6 to 0.7 lb. per gallon. The relevant properties of the ground products of each of the foregoing examples are as follows:

| Example No. | Fluffed Bulk Density, lb./cu. ft. | Wet Cake Density, lb./cu. ft. | Gardner-Coleman Water Absorption, percent | X-ray Identification |
|---|---|---|---|---|
| I | 7 | 11 | 440 | Calcium Silicate Hydrate I. |
| II | 7 | 10 | 430 | Do. |
| III | 13 | 17 | 260 | Do. |
| IV | 15 | 20 | 240 | Do. |

Among other unique and beneficial results of the method comprising this invention is the uniformity of the size of the hydrated calcium silicate particles of the reaction product. For example, relative particle size distribution and uniformity of the products of Examples I, III and IV, all consisting of calcium silicate hydrate I materials prepared under identical conditions but for the order or combining the reactants, are as follows:

| Size Range | Product of Example I | Product of Example III | Product of Example IV |
|---|---|---|---|
| | Percent | Percent | Percent |
| >20 microns | 10.5 | 10.0 | 40.0 |
| 10–20 microns | 19.5 | 52.0 | 35.0 |
| 8–10 microns | 10.0 | 15.0 | 6.0 |
| 6–8 microns | 15.0 | 7.0 | 5.5 |
| 4–6 microns | 22.0 | 5.5 | 3.5 |
| 2–4 microns | 12.0 | 3.0 | 3.0 |
| <2 microns | 11.0 | 7.5 | 7.0 |

Although certain of the physical properties or characteristics exhibited by the various hydrated calcium silicate products of the method of this invention materially differ from those of comparable hydrated calcium silicate products, i.e., those prepared from like materials, mol ratios, concentrations, reaction time and temperatures, etc., their chemical and other properties such as those established or determined by X-ray diffraction patterns, thermobalance, differential thermal analysis remain substantially identical.

Reactants for the practice of the hereinbefore described invention may comprise finely divided lime and finely divided reactive siliceous material, such as diatomaceous earth, quartz, etc., as starting materials. Preferably, finely divided hydrated lime and diatomaceous silicia are employed. The hydrated calcium silicate products of this invention may be prepared utilizing these starting materials in a $CaO/SiO_2$ mol ratio within the approximate range of 0.1–2.0 mols of CaO to 1 mol of $SiO_2$. Preferably the slurries or suspensions of reactive materials include sufficient water to render their consistency such as to enable it to be pumped, e.g., approximately ½ to 2 lbs. of solids per gallon of water. Further, the reaction slurry or suspension should comprise about 8–50 parts by weight of water per part of solids.

In accordance with this invention and to effect reaction between the lime and siliceous components, the reaction vessel should be maintained at a temperature of at least 212° F. for a continuous type reaction, and desirably higher, e.g., in the vicinity of approximately 250° F. for a batch type operation to achieve the desired effect. Preferred reaction temperatures range from about 300 to 375° F. but the maximum temperature for the reaction is limited only by the pressure capacity of the autoclave or vessel and/or the critical point of water but temperatures within the approximate range of 212° F. to 500 F. can usually be employed. Further, the $CaO/SiO_2$ mol ratio, reaction temperature and time, as in the hydrothermal preparation of hydrated calcium silicates by conventional methods or techniques, each have an effect on the type of calcium silicate product resulting from the reaction. For example, relatively low reaction temperatures, about 370° F. or less, and/or short reaction periods, result in a compound commonly known as calcium silicate hydrate I (Taylor, Journal of the Chemical Society, 163, 1953) which can be formed over the entire range of an 0.1 to 2.0 $CaO/SiO_2$ mol ratio. At a temperature of about 212° F. this reaction, on a continuous basis, has been found to be substantially complete in approximately 20 minutes. At relatively higher reaction temperatures, e.g., above about 370° F., and/or at long reaction periods, and with a $CaO/SiO_2$ mol ratio within the range of 0.1 to 0.7, calcium silicate hydrate I is formed first and then partially or completely converted to a low solubility hydrated calcium silicate having the formula $2CaO \cdot 3SiO_2 \cdot 1-2.5H_2O$ and an X-ray diffraction pattern having very strong lines $d=3.12$ A. and $d=4.12$ A. and a medium line at $d=8.34$ A., described in copending United States patent application Serial No. 736,203, filed May 19, 1958. A substantially complete conversion of calcium silicate hydrate I to the foregoing mentioned calcium silicate is obtained in about 2 hours when a $CaO/SiO_2$ mol ratio of 0.5 to 0.6 is employed in conjunction with a reaction temperature of 450° F. However, if the $CaO/SiO_2$ mol ratio is within the range of 0.8 to 1.5 and the reaction temperature in excess of about 370° F., calcium silicate hydrate I also forms first which in turn is partially or completely transformed to xonotlite. A substantially complete conversion to xonotlite can be obtained in about 2 hours with a $CaO/SiO_2$ mol ratio of 1.0 which is employed with a reaction temperature of about 450° F. Reaction times longer than those necessary to complete the reaction typically have no detrimental effect upon the physical characteristics of the resulting products, although, as apparent from the foregoing, they may result in the conversion of calcium silicate hydrate I to another hydrated calcium silicate composition.

It should be understood that the present disclosure is for the purpose of illustration only and that this invention includes all modifications and equivalents which fall within the scope of the appended claims.

What I claim is:

1. A method of increasing the bulk density of hydrothermally prepared hydrated calcium silicates which comprises effecting initial contact of siliceous and lime reactants at a temperature of at least 212° F. by adding an aqueous suspension of reactive siliceous material to an aqueous suspension of lime, proportioning the reactants comprising water and said suspensions of reactive siliceous material and lime to provide a $CaO/SiO_2$ mol ratio of 0.1–2.0 and a reaction medium having a water to solids content of about 8–50 parts by weight of water per part of solids, maintaining the aqueous suspensions of the siliceous and lime reactants at a temperature of at least 212° F. for a reaction period of at least about 20 minutes to effect substantial reaction between the reactive components to form a hydrated calcium silicate.

2. A method of increasing the bulk density of hydrothermally prepared hydrated calcium silicates which comprises effecting initial contact of siliceous and lime reactants at a temperature within the range of approximately 300 to 375° F. by adding an aqueous suspension of reactive siliceous material to an aqueous suspension of lime, proportioning the reactants comprising water and said suspensions of reactive siliceous material and lime to provide a $CaO/SiO_2$ mol ratio of 0.1–2.0 and a reaction medium having a water to solids content to about 8–50 parts by weight of water per part of solids, maintaining the aqueous suspension of the siliceous and lime reactants at a temperature within the range of approximately 300 to 375° F. for a reaction period of at least about 20 minutes to effect substantial reaction between said reactive components to form a hydrated calcium silicate.

3. A method of increasing the bulk density of hydrothermally prepared hydrated calcium silicates which comprises effecting initial contact of siliceous and lime reactants at a temperature of at least 212° F. up to approximately 500° F. by adding an aqueous suspension of reactive siliceous material to an aqueous suspension of lime, proportioning the reactants comprising water and said suspensions of reactive siliceous material and lime to provide a $CaO/SiO_2$ mol ratio of 0.3–1.5 and a reaction medium having a water to solids content of about 8–50 parts by weight of water per part of solids, maintaining the aqueous suspension of the siliceous and lime reactants at a temperature of at least 212° F. up to approximately 500° F. for a reaction period of at least about 20 minutes to effect substantial reaction between said reactive components to form a hydrated calcium silicate.

4. A method of increasing the bulk density of hydrothermally prepared hydrated calcium silicates which comprises effecting initial contact of siliceous and lime reactants at a temperature within the range of approximately 300 to 375° F. by adding an aqueous suspension of reactive siliceous material to an aqueous suspension of lime, proportioning the reactants comprising water and said suspensions of reactive siliceous material and lime to provide a $CaO/SiO_2$ mol ratio of 0.3–1.5 and a reaction medium having a water to solids content of about 8–50 parts by weight of water per part of solids, maintaining the aqueous suspension of the siliceous and lime reactants at a temperature within the range of approximately 300 to 375° F. for a reaction period of at least about 20 minutes to effect substantial reaction between said reactive components to form a hydrated calcium silicate.

5. A method of increasing the bulk density of hydrothermally prepared hydrated calcium silicates which comprises effecting initial contact of siliceous and lime reactants at a temperature of at least 212° F. by adding an aqueous suspension of reactive siliceous material to an aqueous suspension of lime, proportioning the reactants comprising water and said suspensions of reactive siliceous material and lime to provide a $CaO/SiO_2$ mol ratio of 0.1–2.0 and a reaction medium having a water to solids content of about 8–50 parts by weight of water per part of solids, maintaining the aqueous suspensions of the siliceous and lime reactants at a temperature of at least 212° F. for a reaction period of about 2 hours to effect substantial reaction between said reactive components to form a hydrated calcium silicate.

6. A method of increasing the bulk density of hydrothermally prepared hydrated calcium silicates which comprises effecting initial contact of siliceous and lime reactants at a temperature of at least 212° F. up to approximately 500° F. by adding an aqueous suspension of reactive siliceous material to an aqueous suspension of lime, proportioning the reactants comprising water and said suspensions of reactive siliceous material and lime to provide a $CaO/SiO_2$ mol ratio of 0.3–1.5 and a reaction medium having a water to solids content of about 8–50 parts by weight of water per part of solids, maintaining the aqueous suspensions of the siliceous and lime reactants at a temperature of at least 212° F. up to approximately 500° F. for a reaction period of about 2 hours to effect substantial reaction between said reactive components to form a hydrated calcium silicate.

7. A method of increasing the bulk density of hydrothermally prepared hydrated calcium silicates which comprises effecting initial contact of siliceous and lime reactants at a temperature within the range of approximately 300 to 375° F. by adding an aqueous suspension of reactive siliceous material to an aqueous suspension of lime, proportioning the reactants comprising water and said suspensions of reactive siliceous material and lime to provide a $CaO/SiO_2$ mol ratio of 0.3–1.5 and a reaction medium having a water to solids content of about 8–50 parts by weight of water per part of solids, maintaining the aqueous suspensions of the siliceous and lime reactants at a temperature within the range of approximately 300 to 375° F. for a reaction period of about 2 hours to effect substantial reaction between said reactive components to form a hydrated calcium silicate.

8. A method of hydrothermally preparing hydrated calcium silicates having bulk densities of at least approximately 10 lbs. per cu. ft. which comprises effecting initial contact of siliceous and lime reactants at a temperature within the range of approximately 300 to 375° F. by adding an aqueous suspension of reactive siliceous material to an aqueous suspension of lime, proportioning the reactants comprising water and said suspensions of reactive siliceous material and lime to provide a $CaO/SiO_2$ mol ratio of 0.3–1.5 and a reaction medium having a water to solids content of about 8–50 parts by weight of water per part of solids, maintaining the aqueous suspensions of the siliceous and lime reactants at a temperature within the range of approximately 300 to 375° F. for a reaction period of about 2 hours to effect substantial reaction between said reactive components to form a hydrated calcium silicate.

9. A method of increasing the bulk density of hydrothermally prepared hydrated calcium silicates which comprises effecting initial contact of siliceous and lime reactants at a temperature of at least 212° F. by continuous addition of an aqueous suspension of reactive siliceous material to an aqueous suspension of lime through continuous and simultaneous feeding of the siliceous and lime suspensions to a heated reaction vessel to maintain an uninterrupted introduction of said siliceous reactant into the said lime reactant, proportioning the continuous feeding of the reactants comprising water, siliceous material and lime to the reaction vessel to provide a $CaO/SiO_2$ mol ratio of 0.1–2.0 and a reaction medium having a water to solids content of about 8–50 parts by weight of water per part of solids, maintaining the reactive contents of said vessel at a temperature of at least 212° F., continuously and simultaneously with said feeding of the reactants removing the resulting reaction products from said reactor at a rate approximately equivalent to the rate of feed, and retaining the aqueous suspension of said reactants within said vessel for a reaction period of at least about 20 minutes to effect substantial reaction between the reactive components to form a hydrated calcium silicate.

10. A method of increasing the bulk density of hydrothermally prepared hydrated calcium silicates which comprises effecting initial contact of siliceous and lime reactants at a temperature within the range of approximately 300 to 375° F. by continuous addition of an aqueous suspension of reactive siliceous material to an aqueous suspension of lime through continuous and simultaneous feeding of the siliceous and lime suspensions to a heated reaction vessel to maintain an uninterrupted introduction of said siliceous reactant into the said lime reactant, proportioning the continuous feeding of the reactants comprising water, siliceous material and lime to the reaction vessel to provide a $CaO/SiO_2$ mol ratio of 0.1–2.0 and a reaction medium having a water to solids content of about 8–50 parts by weight water per part of solids, maintaining the reactive contents of said vessel at a temperature within the range of approximately 300 to 375° F., continuously and simultaneously with said feeding of the reactants removing the resulting reaction products from said reactor at a rate approximately equivalent to the rate of feed, and retaining the aqueous suspension of said reactants within said vessel for a reaction period of at least about 20 minutes to effect substantial reaction between the reactive components to form a hydrated calcium silicate.

11. A method of increasing the bulk density of hydrothermally prepared hydrated calcium silicates which comprises effecting initial contact of siliceous and lime reactants at a temperature of at least 212° F. up to approximately 500° F. by continuous addition of an aqueous suspension of reactive siliceous material to an aqueous suspension of lime through continuous and simultaneous feeding of the siliceous and lime suspensions to a heated reaction vessel to maintain an uninterrupted introduction of said siliceous reactant into the said lime reactant, proportioning the continuous feeding of the reactants comprising water, siliceous material and lime to the reaction vessel to provide a $CaO/SiO_2$ mol ratio of 0.3–1.5 and a reaction medium having a water to solids content of about 8–50 parts by weight of water per part of solids, maintaining the reactive contents of said vessel at a temperature of at least 212° F. up to approximately 500° F., continuously and simultaneously with said feeding of the reactants removing the resulting reaction products from said reactor at a rate approximately equivalent to the rate of feed, and retaining the aqueous suspension of said reactants within said vessel for a reaction period of at least about 20 minutes to effect substantial reaction between the reactive components to form a hydrated calcium silicate.

12. A method of increasing the bulk density of hydrothermally prepared hydrated calcium silicates which comprises effecting initial contact of siliceous and lime reactants at a temperature within the range of approxmiately 300 to 375° F. by continuous addition of an aqueous suspension of reactive siliceous material to an aqueous suspension of lime through continuous and simultaneous feeding of the siliceous and lime suspensions to a heated reaction vessel to maintain an uninterrupted introduction of said siliceous reactant into the said lime reactant, proportioning the continuous feeding the reactants comprising water, siliceous material and lime to the reaction vessel to provide a $CaO/SiO_2$ mol ratio of 0.3–1.5 and a reaction medium having a water to solids content of about 8–50 parts by weight of water per part of solids, maintaining the reactive contents of said vessel at a temperature within the range of approximately 300 to 375° F., continuously and simultaneously with said feeding of the reactants removing the resulting reaction products from said reactor at a rate approximately equivalent to the rate of feed, and retaining the aqueous suspension of said reactants within said vessel for a reaction period of at least about 20 minutes to effect substantial reaction between the reactive components to form a hydrated calcium silicate.

13. A method of increasing the bulk density of hydrothermally prepared hydrated calcium silicates which comprises effecting initial contact of siliceous and lime reactants at a temperture of at least 212° F. by continuous addition of an aqueous suspension of reactive siliceous material to an aqueous suspension of lime through continuous and simultaneous feeding of the siliceous and lime suspensions to a heated reaction vessel to maintain an uninterrupted introduction of said siliceous reactant into the said lime reactant, proportioning the continuous feeding of the reactants comprising water, siliceous material and lime to the reaction vessel to provide a $CaO/SiO_2$ mol ratio of 0.1–2.0 and a reaction medium having a water to solids content of about 8–50 parts by weight of water per part of solids, maintaining the reactive contents of said vessel at a temperature of at least 212° F., continuously and simultaneously with said feeding of the reactants removing the resulting reaction products from said reactor at a rate approximately equivalent to the rate of feed, and retaining the aqueous suspension of said reactants within said vessel for a reaction period of about 2 hours to effect substantial reaction between the reactive components to form a hydrated calcium silicate.

14. A method of increasing the bulk density of hydrothermally prepared calcium silicates which comprises effecting initial contact of siliceous and lime reactants at a temperature within the range of approximately 300 to 375° F. by continuous addition of an aqueous suspension of reactive siliceous material to an aqueous suspension of lime through continuous and simultaneous feeding of the siliceous and lime suspensions to a heated reaction vessel to maintain an uninterrupted introduction of said siliceous reactant into the said lime reactant, proportioning the continuous feeding of the reactants comprising water, siliceous material and lime to the reaction vessel to provide a $CaO/SiO_2$ mol ratio of 0.3 to 1.5 and a reaction medium having a water to solids content of about 8–50 parts by weight of water per part of solids, maintaining the reactive contents of said vessel at a temperature within the range of 300 to 375° F., continuously and simultaneously with said feeding of the reactants removing the resulting reaction products from said reactor at a rate approximately equivalent to the rate of feed, and retaining the aqueous suspension of said reactants within said vessel for a period of about 2 hours to effect substantial reaction between the reactive components to form a hydrated calcium silicate.

15. A method of hydrothermally preparing hydrated calcium silicates having a bulk density of at least approximately 10 lbs. per cu. ft. which comprises effecting initial contact of siliceous and lime reactants at a temperature within the range of approximately 300 to 375° F. by a continuous addition of an aqueous suspension of reactive siliceous material to an aqueous suspension of lime through continuous and simultaneous feeding of the siliceous and lime suspensions to a heated reaction vessel to maintain an uninterrupted introduction of said siliceous reactant into the said lime reactant, proportioning the continuous feeding of the reactants comprising water, siliceous material and lime to the reaction vessel to provide a $CaO/SiO_2$ mol ratio of 0.3 to 1.5 and a reaction medium having a water to solids content of about 8–50 parts by weight of water per part of solids, maintaining the reactive contents of said vessel at a temperature within the range of 300 to 375° F., continuously and simultaneously with said feeding of the reactants removing the resulting reaction products from said reactor at a rate approximately equivalent to the rate of feed, and retaining the aqueous suspension of said reactants within said vessel for a period of about 2 hours to effect substantial reaction between the reactive components to form a hydrated calcium silicate.

16. A hydrothermal method of preparing a calcium silicate hydrate I product with increased bulk density which comprises effecting initial contact of siliceous and lime reactants at a temperature of at least 212° F. by adding an aqueous suspension of reactive diatomaceous earth to an aqueous suspension of lime, proportioning the reactants comprising water and said suspensions of reactive diatomaceous earth and lime to provide a $CaO/SiO_2$ mol ratio of 0.1–2.0 and a reaction medium having a water to solids content of about 8–50 parts by weight of water per part of solids, maintaining the aqueous suspension of diatomaceous earth and lime reactants at a temperature of 212 to 370 F. for a reaction period of at least about 20 minutes up to approximately 24 hours to effect substantial reaction between the reactive components to form calcium silicate hydrate I.

17. A hydrothermal method of preparing a hydrated calcium silicate product having the formula $$2CaO.3SiO_2.1-2.5H_2O$$

with increased bulk density which comprises effecting initial contact of siliceous and lime reactants at a temperature of at least 212° F. by adding an aqueous suspension of reactive diatomaceous earth to an aqueous suspension of lime, proportioning the reactants comprising water and said suspensions of reactive diatomaceous earth and lime to provide a $CaO/SiO_2$ mol ratio of 0.1–0.7 and a reaction medium having a water to solids content of about 8–50 parts by weight of water per part of solids, maintaining the aqueous suspension of diatomaceous earth and lime reactants at a temperature of at least about 370° F. for a reaction period of at least about 20 minutes up to approximately 24 hours to effect substantial reaction between the reactive components to form a hydrated calcium silicate having the formula 2CaO.3SiO₂.1–2.5H₂O.

18. A hydrothermal method of preparing the hydrated calcium silicate xonotlite with increased bulk density which comprises effecting initial contact of siliceous and lime reactants at a temperature of at least 212° F. by adding an aqueous suspension of reactive diatomaceous earth to an aqueous suspension of lime, proportioning the reactants comprising water and said suspensions of reactive diatomaceous earth and lime to provide a CaO/SiO₂ mol ratio of 0.8 to 1.5 and a reaction medium having a water to solids content of about 8–50 parts by weight of water per part of solids, maintaining the aqueous suspension of the diatomaceous earth and lime reactants at a temperature of at least 370° F. for a reaction period of at least about 20 minutes up to approximately 24 hours to effect substantial reaction between the reactive components to form xonotlite.

19. The hydrated calcium silicate product calcium silicate hydrate I composed of discrete particles of a bulk density of at least 10 pounds per cubic foot and wet cake density of at least 14 pounds per cubic foot with at least 50% of said particles greater than 8 microns, said calcium silicate comprising the hydrothermal reaction products of effecting initial contact of siliceous and lime reactants at a temperature of at least 212° F. by adding an aqueous suspension of reactive diatomaceous earth to an aqueous suspension of lime, proportioning the reactants comprising water and said suspensions of reactive diatomaceous earth and lime to provide a CaO/SiO₂ mol ratio of 0.1–2.0 and a reaction medium having a water to solids content of about 8–50 parts by weight of water per part of solids, maintaining the aqueous suspension of diatomaceous earth and lime reactants at a temperature of 212–370° F. for a reaction period of at least about 20 minutes up to approximately 24 hours to effect substantial reaction between the reactive components.

20. The hydrated calcium silicate $$2CaO.3SiO_2.1-2.5H_2O$$

composed of discrete particles of a bulk density of at least 10 pounds per cubic foot and wet cake density of at least 14 pounds per cubic foot with at least 50% of said particles greater than 8 microns, said calcium silicate comprising the hydrothermal reaction products of effecting initial contact of siliceous and lime reactants at a temperature of at least 212° F. by adding an aqueous suspension of reactive diatomaceous earth to an aqueous suspension of lime, proportioning the reactants comprising water and said suspensions of reactive diatomaceous earth and lime to provide a CaO/SiO₂ mol ratio of 0.1–0.7 and a reaction medium having a water to solids content of about 8–50 parts by weight of water per part of solids, maintaining the aqueous suspension of diatomaceous earth and lime reactants at a temperature of at least about 370° F. for a reaction period of at least about 20 minutes up to approximately 24 hours to effect substantial reaction between the reactive components.

21. The hydrated calcium silicate xonotlite composed of discrete particles of a bulk density of at least 10 pounds per cubic foot and wet cake density of at least 14 pounds per cubic foot with at least 50% of said particles greater than 8 microns, said calcium silicate comprising the hydrothermal reaction products of effecting initial contact of siliceous and lime reactants at a temperature of at least 212° F. by adding an aqueous suspension of reactive diatomaceous earth to an aqueous suspension of lime, proportioning the reactants comprising water and said suspensions of reactive diatomaceous earth and lime to provide a CaO/SiO₂ mol ratio of 0.8–1.5 and a reaction medium having a water to solids content of about 8–50 parts by weight of water per part of solids, maintaining the aqueous suspension of diatomaceous earth and lime reactants at a temperature of at least 370° F. for a reaction period of at least about 20 minutes up to approximately 24 hours to effect substantial reaction between the reactive components.

References Cited in the file of this patent

UNITED STATES PATENTS

| | | |
|---|---|---|
| 2,215,891 | Thomsen et al. | Sept. 24, 1940 |
| 2,547,127 | Kalousek | Apr. 3, 1951 |
| 2,665,996 | Kalousek | Jan. 12, 1954 |
| 2,888,377 | Allen | May 26, 1959 |

OTHER REFERENCES

Flint et al.: "J. Res. National Bureau Stds.," vol. 21, RP 1147, pp. 617–638, November 1938.